United States Patent Office 3,538,139
Patented Nov. 3, 1970

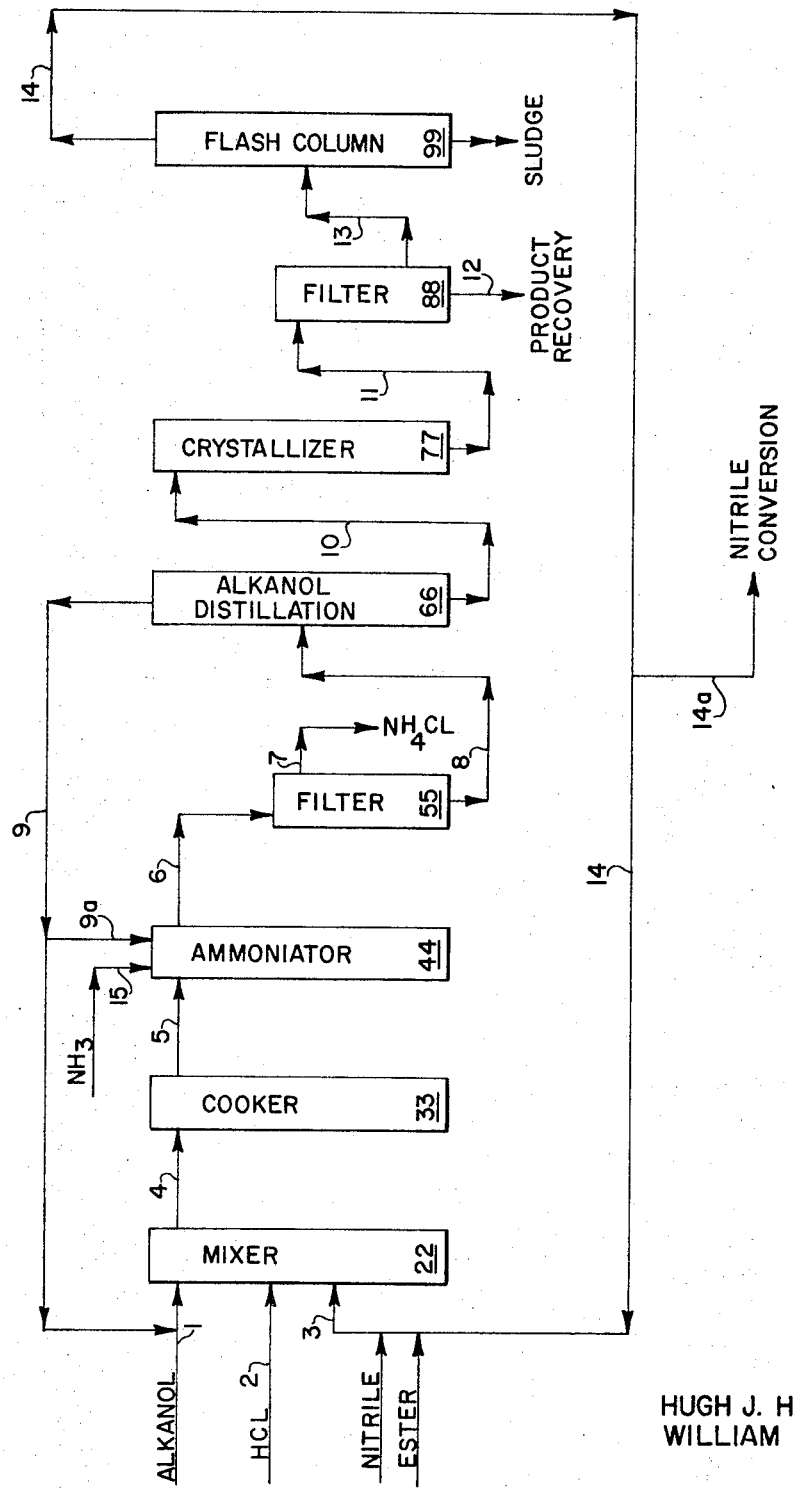

3,538,139
IMIDO ESTER HYDROCHLORIDE AND AMIDINE HYDROCHLORIDE SYNTHESIS
Hugh J. Hagemeyer, Jr., and William J. Gammans, Longview, Tex., assignors to Eastman Kodak Company, Rochester, N.Y., a corporation of New Jersey
Filed July 24, 1968, Ser. No. 747,345
Int. Cl. C07c *119/18, 119/19*
U.S. Cl. 260—453    10 Claims

ABSTRACT OF THE DISCLOSURE

Process for preparing imido ester hydrochlorides and amidine hydrochlorides by contacting a nitrile, a lower alcohol and hydrogen chloride in the presence of particular solvents to form an imido ester hydrochloride solution and subsequently contacting the imido ester hydrochloride solution with ammonia to obtain the corresponding amidine hydrochloride. Imido ester hydrochlorides are well-known and valuable compounds, for example, as chemical intermediates for valuable chemical compounds such as amidine hydrochlorides. Amidine hydrochlorides are useful, for example, as intermediates in the production of coccidiostats.

---

This invention relates to the preparation of imido ester hydrochlorides and amidine hydrochlorides. In one of its specific embodiments, the invention relates to an improved continuous flow process for the production of butyramidine hydrochloride.

The preparation of imido ester hydrochlorides and amidine hydrochlorides is known. Historically, the conventional or classical method of preparing amidine hydrochlorides included passing anhydrous hydrogen chloride into an equimolar mixture of a nitrile and a lower alcohol to form an imido ester. The imido ester is then treated with an alcoholic solution of anhydrous ammonia to give the amidine hydrochloride. Primary and secondary amines can be substituted for ammonia to yield N-substituted amidines. The first step of this process, i.e., the production of the imido ester hydrochloride, is very slow since little or no agitation of the reactants is possible because of the formation of the imido ester product. Reaction times for this step are on the order of 24 hours to 7 days. Various diluents such as diethyl ether and dioxane have been employed but with little or no advantage being gained in the time required for reaction.

Recently, a notable improvement in the classical method of preparing imido ester and amidine hydrochlorides was disclosed in copending application Ser. No. 527,736, filed Feb. 16, 1966 now U.S. Pat. 3,402,193. By this method, anhydrous hydrogen chloride is passed into a mixture comprising a lower alcohol and a stoichiometric excess of the nitrile at temperatures up to about 50° C. to form the imido ester. The imido ester hydrochloride is then treated with an alcoholic solution of anhydrous ammonia or primary or secondary amines to give the corresponding amidine hydrochloride or N-substituted amidine hydrochloride.

The process of application Ser. No. 527,736 provides significant improvements in the preparation of amidine hydrochlorides. The process may be operated on a continuous basis; however, the excess nitrile which is recovered from the amidine hydrochloride product mixture must be recycled in order for the process to be economical. It has been discovered that during the reaction a small amount, e.g., 1–3 percent, of by-product ester, corresponding to the reaction product of the alcohol reactant and the acid corresponding to the nitrile reactant, is formed, thereby contaminating the excess nitrile stream.

The recycle of this nitrile stream results in a buildup of by-product ester. Ammonolysis of esters to an alcohol and an amide, which is known would seemingly dictate the removal of the by-product ester from the nitrile recycle stream since an essential step in producing amidine hydrochlorides involves treatment with ammonia of the imido ester reaction mixture containing the ester. The ester cannot be removed by distillation, nor can its formation be prevented. It is possible to recycle the excess nitrile stream to a reactor in which the ester is converted to the corresponding nitrile, but an operation of this sort on a stream containing so little ester is uneconomical.

Accordingly, it is an object of this invention to provide an improved process for preparing imido hydrochlorides and amidine hydrochlorides.

Surprisingly, we have discovered that the reactants in the amidine hydrochloride synthesis can be solvated by the alkyl ester derivative, hereafter referred to as alkyl ester, of the alcohol and nitrile reactants. The alkyl ester is the ester corresponding to the reaction product of the alcohol reactant and the acid corresponding to the nitrile reactant. We have further discovered that this alkyl ester can be substituted for the excess nitrile used in the process described in application Ser. No. 527,736. However, in contradistinction to the process of Ser. No. 527,736, wherein the recycle stream comprises mainly unreacted nitrile with 1–3 percent alkyl ester by-product, the recycle stream in the process of our invention comprises mainly alkyl ester together with a minor amount of unreacted nitrile. A portion of this recycle stream can be discarded continuously to maintain the desired alkyl ester concentration. Fresh nitrile can be added to the reactor to replace the nitrile which is converted to products and that removed from the recycle stream. In the process of our invention the alkyl ester-nitrile stream which is withdrawn from the recycle stream is rich in alkyl ester and can be economically processed to convert the alkyl ester to the corresponding nitrile for reuse.

Therefore, in accordance with the present invention, stoichiometric amounts of a lower alcohol and a nitrile are admixed with, for example, 25.75 weight percent, preferably 30–40 weight percent, based on total solution, of the alkyl ester derivative of the alcohol and nitrile reactants. The mixture is contacted with a stoichiometric amount of anhydrous hydrogen chloride to form the imido ester hydrochloride. The resulting reaction mixture, which comprises imido ester hydrochloride, nitrile, alcohol and alkyl ester, is passed into a second reactor where ammonia is added at a temperature of 30°–35° C. to convert the imido ester hydrochloride to the corresponding amidine hydrochloride. The reaction mixture is filtered or centrifuged to remove by-product ammonium chloride. The filtrate is stripped free of alcohol which is recycled. The residue is cooled to precipitate the amidine hydrochloride which is then recovered by filtration. The filtrate is flash distilled to recover a recycle stream comprising a solution of nitrile in alkyl ester.

As noted, the discovery that the alkyl ester derivative of the alcohol and nitrile reactants is useful as a solvent in the synthesis of amidine hydrochlorides is surprising in view of the known tendency of such esters to undergo ammonolysis to the corresponding alcohol and amide, since an essential step in the synthesis involves treatment of the reaction mixture with ammonia. However, temperature control during the reaction of imido butyrate hydrochloride with ammonia at least substantially inhibits the ammonolysis of the alkyl ester. The temperature in the ammonolysis reactor should be controlled in the range of about 0° to about 35° C., preferably in the range of 30° to 35° C. for optimum conversion of imido ester hydrochloride to amidine hydrochloride with minimum ammonolysis of solvent. In the reaction to form the imido ester hydrochloride intermediate, the temperature can be within the range of about —10° to about 50° C., preferably between 35°–50° C. Somewhat higher or lower temperatures can be employed without departing from the spirit of the invention.

In the practice of our invention, the alcohol and nitrile reactants are employed in stoichiometric proportions. The amount of alkyl ester solvent is in the range of about 0.3 to about 3 moles, preferably in the range of 0.35 to 1 mole, and especially 0.35 to 0.75 mole, per mole of nitrile. Somewhat higher or lower amounts of reactants and solvent can be utilized without departing from the spirit of the invention.

The process of the invention will be better understood by reference to the accompanying drawing which is a flow diagram of a typical embodiment of the invention. As shown in the drawing, alkanol (through line 1), nitrile and alkyl ester (through line 3) are introduced into mixer 22, maintained at 0°–20° C. Anhydrous hydrogen chloride is introduced through line 2 into mixer 22. The solution is withdrawn from mixer 22 via line 4 and introduced into cooker 33, which is maintained at a temperature in the range of 35°–40° C. The imido ester solution from cooker 33 is overflowed through line 5 to ammoniator 44, which is a stirred vessel maintained at 35° C. by external cooling. Ammonia and alkanol are introduced into ammoniator 44 via lines 15 and 9a, respectively. The reaction mixture is withdrawn from ammoniator 44 through line 6 and introduced into filter 55 where by-product ammonium chloride is taken off through line 7. The filtrate is introduced through line 8 into distillation column 66 where the alkanol is distilled for recycle to mixer 22 via line 9. The residue is withdrawn through line 10 and introduced into crystallizer 77, where the amidine hydrochloride is precipitated. The suspension of amidine hydrochloride is introduced into filter 88 through line 11 where amidine hydrochloride is taken off via line 12 and sent to product recovery (not shown). The filtrate is introduced through line 13 into flash column 99 where unreacted nitrile and alkyl ester are taken overhead through line 14 for recycle to mixer 22. A portion of the nitrile—alkyl ester stream is withdrawn through line 14a and passed to the nitrile conversion plant (not shown).

The process of our invention can be applied to the preparation of imido esters and amidines which are known to the prior art, e.g., many of those disclosed in Wagner and Zook, "Synthetic Organic Chemistry," (1953), at pages 637 and 638. The nitriles that can be employed in the process described herein are alkyl, aralkyl and aryl nitriles, including ring-alkylated aryloxyalkylnitriles, having from 2 to 19 carbon atoms. The alkyl nitriles having up to 8 carbon atoms are particularly useful. Representative nitriles include acetonitrile, butyronitrile, valeronitrile, glutaronitrile, nicotinonitrile, benzonitrile, p-chlorobenzonitrile, p-bromobenzonitrile, o-nitrobenzonitrile, p-nitrobenzonitrile, phenylacetonitrile, p - hydroxyphenylacetonitrile, p-methoxybenzonitrile, alpha-naphthonitrile, beta-naphthonitrile, tributylacetonitrile, phenoxyacetonitrile, o-, m-, and p-toloxyacetonitrile, thymyloxyacetonitrile, carvacryloxyacetonitrile, 3-methyl-4-chlorophenoxyacetonitrile, o-i-propylphenoxyacetonitrile and 2,5-dimethylphenoxyacetonitrile.

Any lower alkanol is operable in the synthesis of the imido esters. Since the alcohol moiety of the imido ester is split off during the ammonolysis step and is preferably separated from the reaction product mixture by distillation for recycle to the initial reaction zone, the lower alkanols having from 1 to about 6 carbon atoms are preferred.

The various aliphatic and aromatic primary and secondary amines that can be substituted for ammonia in the ammonolysis step to give the corresponding N-substituted amidines are well known in the art. These include, but are not limited to, amines such as methylamine, dimethylamine, ethylene diamine, ethylamine, diethylamine, butylamine, dibutylamine, phenylethylamine, diphenylamine, aniline and m-phenylenediamine.

The following examples will serve to illustrate the invention. These examples are by way of illustration and should not be construed as a limitation of the scope of the invention. In addition, it is to be noted that Example 1 does not illustrate the invention per se, but is a control to illustrate certain advantages of the invention described herein.

EXAMPLE 1

In the following example, butyramidine hydrochloride is prepared by the procedure of application Ser. No. 527,736. This example demonstrates the undesirably large volumes of excess nitrile stream which must be treated in an auxiliary process in order to maintain the amount of nitrile in the reaction zone at the desired concentration.

A solution of 92 grams (2 moles) absolute ethanol in 276 grams (4 moles) anhydrous butyronitrile is charged to a 1-liter flask fitted with a stirrer, thermometer, gas dispersion tube and condenser fitted with a drying tube. 77 grams (2.1 moles) anhydrous hydrogen chloride is passed into the stirred solution while the temperature of the solution is maintained below 10° C. by external cooling. The mixture is warmed to 35°–40° C., at which temperature it is maintained for 3.5 hours. The mixture is cooled to 20–30° C. and 25 ml. absolute alcohol is added. Anhydrous ammonia is then added until the solution pH is 7–8. The temperature during ammonia addition is maintained below 35° C. The mixture is stirred 2.0 hours, filtered, and the residue, which is ammonium chloride, is washed with 25 ml. absolute alcohol. The filtrate is transferred to a distillation apparatus where 114 grams ethanol is recovered by distillation through a 10-tray Oldershaw column. The residue is cooled to precipitate butyramidine hydrochloride (97 grams) which is recovered by filtration. The filtrate is flash distilled to give 206 grams of distillate composed of 191 grams butyronitrile and 15 grams ethyl butyrate. This solution cannot be resolved into its components by distillation. In order to utilize the recovered nitrile in a second operation, the entire solution must be charged to a reactor in which the ethyl butyrate is converted to butyronitrile by known procedures. Thus, for approximately 100 parts butyramidine hydrochloride, approximately 200 parts of solution must be processed in a nitrile plant.

EXAMPLE 2

The same conditions and procedure as in Example 1 are used, only the initial reactor charge is 92 grams (2 moles) ethanol, 138 grams (2 moles) butyronitrile and 138 grams (1.2 moles) ethyl butyrate. Work-up is as in Example 1. Eighty grams butyramidine hydrochloride is recovered. One hundred twelve grams ethanol is recovered. The flash-distilled nitrile-ester mixture weighs 215 grams and is composed of 153 grams ethyl butyrate and 62 grams butyronitrile. Thus, in order to recycle this solution for reuse, 21 grams will have to be removed and 82 grams fresh nitrile added to equal the initial charge of 138 grams each of butyronitrile and ethyl butyrate. The 21 grams solution, composed of 71 percent ethyl butyrate–29 percent butyronitrile, can be procesed for conversion of the ester to nitrile. Thus, for approximately 100 parts butyramidine hydrochloride produced, only 25 parts solutions must be processed in a nitrile plant.

EXAMPLE 3

This example shows a typical synthesis via the continuous method described by the invention. A solution made up of n-butyronitrile, 1.00 part by weight; ethanol, 0.67 part and ethyl butyrate, 1.00 part; is led into a vessel controlled at 0–20° C. where anhydrous hydrogen chloride, 0.54 part; is passed into it. This solution passes into a finishing reactor maintained at 35–40° C. Feed rates and vessel sizes are predetermined to give residence times of 0.5 hour at 0–20° C. and 3.5 hours at 35–40° C. The resulting solution is overflowed into a stirred vessel maintained at 35° C. by external cooling. Ammonia, 0.26 part, and absolute ethanol, 0.26 part, are added. Rates of addition are determined to give 4.0 hours residence time. The reaction mixture is passed into a filter where by-product ammonia chloride is removed. The filtrate passes into a distillation column where ethanol is distilled for recycle. The residue is cooled at 10–25° C. to precipitate the butyramidine hydrochloride, 0.7 part. The butyramidine hydrochloride is recovered by filtration or centrifugation. The filtrate is passed into a column where ethyl butyrate-butyronitrile is recovered for recycle. Ten percent of the recovered nitrile-ester solution is removed in a sidestream to leave a solution containing 1.0 part ethyl butyrate. Fresh nitrile is added to give a total of 1.0 part butyronitrile in 1.0 part ethyl butyrate. This stream is then recycled. The ethyl butyrate-butyronitrile solution removed in the sidestream is either discarded or stored pending treatment to convert the ethyl butyrate to butyronitrile by esablished procedures.

The invention has been described in detail with particular reference to preferred embodiments thereof, but it will be understood that variations and modifications can be effected within the spirit and scope of the invention described hereinabove and as defined in the appended claims.

We claim:
1. In a process for the preparation of imido ester hydrochlorides by the reaction of alkyl, aralkyl, aryl, alkaryl and aryloxyalkyl nitriles having from 2–19 carbon atoms with a lower alkanol and anhydrous hydrogen chloride at a temperature of −10° to 50° C.; the improvement wherein said reactants are contacted while dissolved in an alkyl ester, the alcohol moiety of which corresponds to the alcohol reactant and the acid moiety of which corresponds to the nitrile reactant.

2. A process according to claim 1 wherein the alkyl ester comprises from 25 to 75 weight percent of the total solution.

3. A process according to claim 2 wherein the alkyl ester comprises from 30 to 40 weight percent of the total solution.

4. A process according to claim 2 wherein said nitrile is an alkyl nitrile having from 1 to 8 carbon atoms.

5. A process according to claim 2 wherein said nitrile is an alkyl nitrile having 4 carbon atoms.

6. Process of claim 1 wherein the reaction mixture is agitated.

7. Process according to claim 1 for preparing alkyl imidobutyrate hydrochloride in which equimolar amounts of butyronitrile and an alcohol having from 1 to 6 carbon atoms, dissolved in an alkylbutyrate, are contacted with anhydrous hydrogen chloride at a temperature of −10° to 50° C., said alkyl butyrate comprising about 25 to 75 weight percent of the solution and the alkyl moiety of said alkyl butyrate corresponding to that of the alcohol reactant.

8. Process for preparing amidine hydrochlorides which comprises contacting anhydrous hydrogen chloride and stoichiometric amounts of an alkyl, aralkyl, aryl or alkaryl nitrile having 2 to 19 carbon atoms with a lower alkanol, dissolved in an alkyl ester derived from the alcohol and nitrile reactants at a temperature in the range of −10° to 50° C. to form a solution of imido ester hydrochloride in said alkyl ester; contacting said imido ester hydrochloride solution with anhydrous ammonia at a temperature in the range of 0° to 35° C. to form an amidine hydrochloride; and recovering said amidine hydrochloride.

9. Process according to claim 8 for producing butyramidine hydrochloride which comprises contacting anhydrous hydrogen chloride and stoichiometric amounts of butyronitrile and an alcohol having 1–6 carbon atoms dissolved in alkyl butyrate, said alkyl having 1–6 carbon atoms, at a temperature of −10° to 50° C. to form alkyl butyrimido hydrochloride solution in alkyl butyrate; contacting said alkyl butyrimido hydrochloride with anhydrous ammonia at a temperature of 0° to 35° C. to form butyramidine hydrochloride; and recovering said butyramidine hydrochloride.

10. Process according to claim 9 wherein said alkyl butyrate comprises from 30 to 40 weight percent of the total solution.

References Cited

Roger et al.: Chemical Reviews, vol. 61, The Chemistry of the Imidates, pp. 179–184 (1961).

LEWIS GOTTS, Primary Examiner

D. G. RIVERS, Assistant Examiner

U.S. Cl. X.R.

260—564